W. M. FULTON.
HUMIDIFYING DEVICE.
APPLICATION FILED JULY 24, 1916.
1,338,916.
Patented May 4, 1920.
2 SHEETS—SHEET 1.
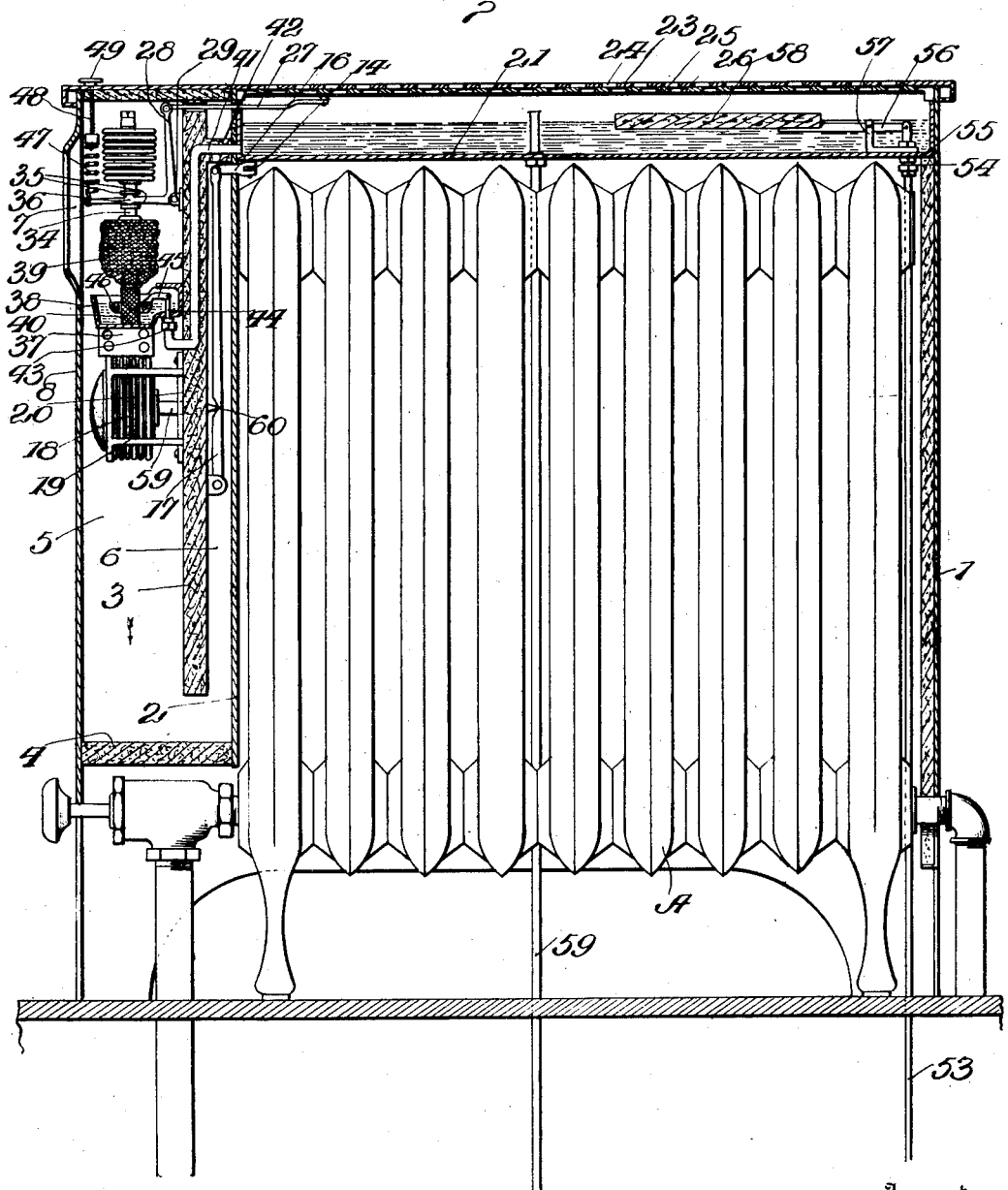

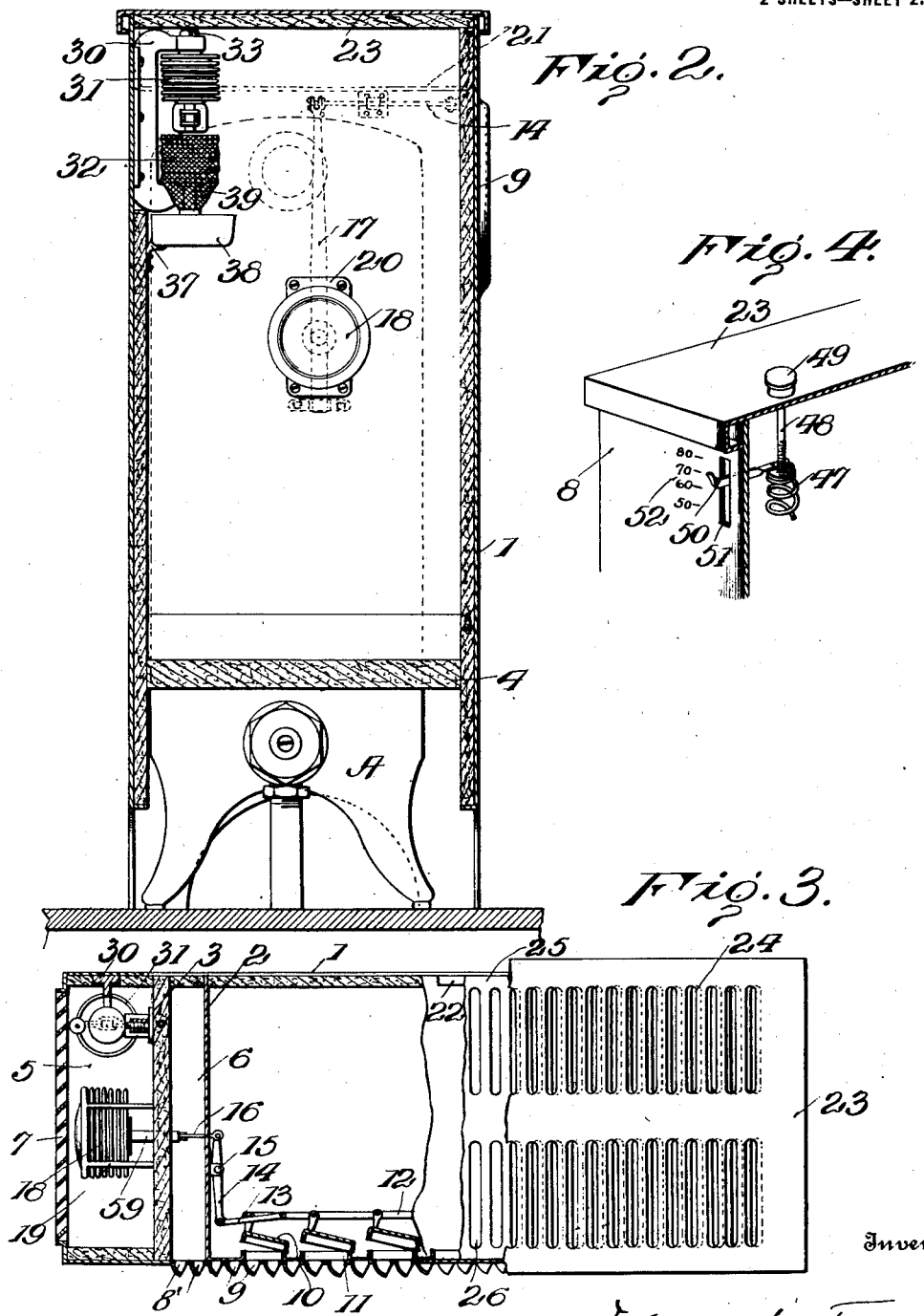

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

HUMIDIFYING DEVICE.

1,338,916.        Specification of Letters Patent.        Patented May 4, 1920.

Application filed July 24, 1916. Serial No. 110,959.

*To all whom it may concern:*

Be it known that I, WESTON M. FULTON, a citizen of United States of America, and a resident of Knoxville, Tennessee, have invented a new and useful Improvement in Humidifying Devices, which invention is fully set forth in the following specification.

This invention relates to devices for supplying moisture to the air to maintain the relative humidity at a desired amount.

In certain cases it is very desirable that the relative humidity within a room or apartment be maintained substantially constant throughout long periods of time. Hospitals, textile mills, schools, horticultural experimental laboratories, etc., are instances wherein substantially constant relative humidity is highly desirable, if not absolutely essential. It is an object of this invention to provide an improved device which shall automatically maintain the relative amount of moisture in the air of a room or apartment substantially constant.

It is a further object of this invention to provide a casing adapted to closely embrace a radiator suitable for heating a room, in which term is to be embraced the apartments or inclosures of buildings of all varieties, and having means for automatically supplying and regulating the supply of vapor, said means preferably being positioned within such casing. Said casing may also be provided with means, preferably automatic, for regulating the flow of heated air therethrough.

A still further object of the invention is to provide a device of the character described which is compact, simple and inexpensive to manufacture, and which is accurate and efficient in operation. Other objects of the invention will appear as the description proceeds.

Stated generally, the invention comprises a casing adapted to closely embrace a radiator of any suitable type appropriate for heating a room, said casing preferably being provided with means for regulating the escape therefrom of the heated air, which latter means may be automatic. Said casing is provided with a vaporizing pan adapted to be subjected to the heat of said radiator, and escape of vapor from the vaporizing pan is regulated by means under the control of the moisture in the atmosphere, such hygrometric means preferably being disposed within the casing and adjustable to predetermine a maximum relative humidity beyond which the escape of vapor from the vaporizing pan shall cease.

The invention is capable of receiving a variety of mechanical expressions. While, for the purpose of illustration, a specific embodiment of the invention has been shown in the accompanying drawings and described with considerable particularity in the description herein, it is to be expressly understood that such specific embodiment is for purposes of illustration only, and is not to be construed as a definition of the limits of the invention, reference being had to the appended claims for that purpose.

Referring to the accompanying drawings, wherein the same reference characters designate corresponding parts in the several figures, Figure 1 is a vertical longitudinal section through a radiator casing embodying the present invention;

Fig. 2 is a transverse vertical section of the casing taken adjacent the left-hand end of Fig. 1;

Fig. 3 is a plan view, parts being broken away to show other parts beneath; and

Fig. 4 is a perspective view of the means provided for adjusting the hygrometric regulating means.

While the invention is herein shown and described as embodied in a casing for a radiator, it is to be understood that the invention, as respects certain features thereof, is capable of use in conjunction with any suitable source of heat.

1 is a casing for a room radiator A of any preferred type, such casing being shown as constructed of sheet metal and having its walls lagged with any suitable material for preventing the loss of heat by conduction therethrough. In the form shown, casing 1 is extended at one end to provide a circulation chamber to contain the automatic controlling device or devices for the regulating means hereinafter to be described. Such circulation chamber is preferably separated from the radiator chamber by an unlagged partition 2 extending transversely of the casing in a position contiguous to the corresponding end of the radiator. Depending within the circulation chamber is a vertical partition 3 of any suitable heat lagging material, such partition extending nearly to the bottom of the chamber, which chamber may be closed by a wall 4, also of heat lagging material. Partition 3 therefore divides the circulation chamber into two vertical passages 5 and 6. Air is admitted to the passage 5 through a series of louvers or grill 7 shown as positioned in the upper portion of the end wall 8 of the radiator casing. Circulation is induced through the said passages 5 and 6 owing to the currents set up convectionally by the hot wall or unlagged partition 2, air entering through the louvers or grill 7, passing downward through the passage 5 in the direction of the arrow, being deflected by the bottom 4, and thence rising through the passage 6 to escape through the louvers or grill 8' in the upper portion of the radiator casing.

A series of louvers or grill 9 is shown as extending from the partition 2 to the opposite end wall of the radiator casing to provide for the egress of heated air which entering adjacent the bottom of the radiator casing and rising convectionally from the heating effect of the radiator therein, may escape through the said louvers or grill 9.

Means are preferably provided for regulating the flow of heated air through the casing and past the radiator, which may take the form of a damper of any suitable construction provided with any suitable operating means. In the form shown said damper comprises a plurality of damper members 10 adapted to close the apertures 11 provided in the upper portion of the front wall of the casing in the rear of the louvers or grill 9, the same being pivotally mounted on the front wall of the casing and pivotally connected with an operating bar 12 extending parallel to the front wall of the casing. Pivotally connected with the operating bar 12 is a link 13, in turn pivotally connected with an operating lever 14 fulcrumed at 15 on a bracket mounted on the partition 2. Pivotally connected to the opposite end of the lever 14 is a link 16, in turn pivotally connected to a lever 17 which may be operated to actuate the damper by any suitable means. In order that the temperature of the air may be maintained automatically at a desired degree, the lever 17 is shown as controlled by a thermostat 18 mounted by means of a spider 19 upon a plate or bracket 20 rigidly secured to the partition 3. Thermostat 18 is thus positioned in passage 5 in the path of air being drawn in from the room or apartment in which the radiator casing is positioned, and, controlled by the temperature of such air, in turn controls the damper for regulating the escape of heated air from the interior of the casing.

Positioned in the upper portion of the radiator casing and in the path of the heated air as it rises convectionally past the radiator, so that such air shall impinge thereon, is a vaporizing pan 21. While the embodiment illustrated shows a flat, shallow, pan-like structure, it is to be expressly understood that the term "vaporizing pan" is to be interpreted generically to cover any suitable vessel provided for supplying moisture to the atmosphere, whatever be its configuration. Also, while the pan has been shown as positioned in the top of the radiator casing, it is to be understood that it may be positioned at any other suitable place without departing from the spirit of this invention. The upper longitudinal edges of vaporizing pan 21 are shown as flanged inwardly, at 22, to provide slideways for the damper regulating the escape of vapor from such pan. The radiator casing is provided with apertures for the escape of water vapor from the vaporizing pan and with damper mechanism of any suitable construction for controlling such apertures. In the form shown, the top 23 of the radiator casing is provided with a series of apertures 24 of any preferred number and configuration, being illustrated as two series of oblong apertures separated by closed spaces somewhat broader than the apertures. Sliding upon the ways 22, between such ways and cover 23, is a longitudinally movable damper plate 25 provided with a series of apertures 26 conforming in number, shape, and relative position to the apertures 24 in the top 23. By longitudinal reciprocation of the damper plate 25, apertures 26 may be brought into register with the apertures 24 or may be brought completely out of register with the apertures 24, the closed spaces between the apertures 26 then completely closing the former owing to the slight excess width of the closed spaces between the apertures 26.

To provide for the actuation of the damper regulating the escape of vapor from the vaporizing pan, a link 27 is pivotally connected to the damper plate 25, and is in turn pivotally connected to a bell-crank 28 fulcrumed at 29 upon a bracket extending into the passage 5 from the partition 3. Automatic means under the control of the amount of moisture in the atmosphere are provided for actuating the bell-crank 28, such hygrometric means in the embodiment illustrated employing the generic principle of a wet and dry bulb hygrometer. In the form shown, a U-shaped bracket 30 is mounted upon a wall of the radiator casing and extends into the passage 5. Mounted upon the inwardly disposed legs of the bracket are opposed thermosensitive devices 31 and 32 suitably held in position upon the aforesaid bracket as by lock-nuts 33. While any suitable form of thermosensitive device may be employed, the embodiment illustrated comprises two expansible and collapsible corrugated metal vessels, such vessels being hermetically sealed and containing a volatile liquid of low boiling point so that there shall always be a vapor tension within such vessels. The stationary walls of the thermostats bear against the legs of the U-shaped bracket 30. The movable walls of said thermostats are connected by a shaft or rod 34 provided with flanges 35 in a position to engage, above and below, the circular enlargements 36 upon the forked lower arm of the bell-crank 28.

Disposed below the lower thermostat 32, and mounted upon the wall of the casing by any suitable form of bracket 37, is a vessel 38 preferably in axial alinement with the shaft 34. Received within the vessel 38 is the lower end of a wick 39, the upper portion of which is shown as entirely covering the lower thermostat 32. The end of the wick within the vessel 38 is preferably inclosed in a wire-gauze tube 40 positioned in the central portion of said vessel. Vessel 38 is designed to be supplied with water which shall be taken up through capillary attraction by the lower end of wick 39 to maintain the entire wick saturated, and thereby subject the lower thermostat 32 to the cooling influence of evaporation.

Means of any suitable construction are preferably provided for automatically supplying the vessel 38 with water. In the embodiment illustrated, a piece of piping 41, desirably of seamless, soft copper tubing, connects one end of the vaporizing pan 21 with the vessel 38. Piping 41 preferably passes through a block or boss 42 of lagging material and thence downwardly within the partition 3, the lagging protecting the piping from the currents of hot air, and thereby maintaining the water passing therethrough at approximately normal temperature. At its lower end pipe 41 is bent upwardly and connects through any suitable form of union 43 with the vessel 38. Any suitable means may be provided to control the admission of water to the vessel 38; in the form shown, a ball-valve 44 is swung from a lever 45 provided at its opposite end with a cork-float 46 in the form of an annulus surrounding the wick 39 and the tube 40, the latter preventing the wick from fouling the float.

Means are preferably provided for adjusting the point or condition of relative humidity at which the opposed thermostats shall operate the damper for regulating the escape of vapor from the vaporizing pan. In the embodiment illustrated a coiled spring 47 is connected at one end to the lower arm of bell-crank 28, and at its upper end is screw-threaded upon an adjustable set screw 48 extending through the top of the casing and provided at its upper end with a thumb-nut 49. To indicate the condition of adjustment of set screw 48, the same is preferably provided with a lateral arm 50 extending through a slot 51 in the end wall of the casing and coöperating with a series of graduations 52 which may indicate degrees of relative humidity, or any other arbitrary system of graduation desired.

Means are desirably provided for automatically supplying the pan 21 with water to compensate for the evaporation therefrom. In the embodiment illustrated a pipe 53 connects with any desired source of water supply and extends upwardly within the radiator casing, being joined at its upper end by any suitable form of union 54 with a nipple 55 extending through the bottom of the vaporizing pan. Admission of the water to the pan is shown as controlled by a valve swung from one arm of lever 56 pivoted on bracket 57 and provided at its opposite end with a float 58. To insure against overflow of the vaporizing pan into the room or apartment in which the radiator casing may be positioned in case the float-valve 56, 58 fails to operate, an overflow pipe 59 extends up within the radiator casing into the vaporizing pan to a point just below the top thereof.

In operation, water flows from the source of supply through pipe 53 into the vaporizing pan 21, until the level of the water therein operating upon float 58 causes the closing of the valve controlling the admission of water to the pan. Assuming damper members 10 to be in partly open position, hot air enters the radiator casing adjacent the floor, rises convectionally therein, is heated by the radiator, and escapes through the louvers or grill 9. The hot air impinges squarely upon the bottom of the vaporizing pan 21, raises the temperature of the water therein, and causes evaporation. Water flows from the vaporizing pan 21 through piping 41 into vessel 38, until float 46 closes the valve 44 against the small head of water in the piping, to prevent further admission of water until float 46 shall again fall with the level of the water in the vessel. The water in the vessel 38 is absorbed by the wick 39 and surrounds the lower thermostat 32 with a thin film of water. Air is drawn in through the louvers or grill 7, passes down over the thermostats 31 and 32, over the thermostat 18, up through passage 6, and out through the louvers or grill 8' which are always open. When the temperature of the air in the room or apartment in which the radiator casing is positioned rises above the predetermined amount, such air in descending through the passage 5 heats the thermostat 18 and causes an expansion thereof, whereby thrust-pin 59, attached to the movable wall of the thermostat and bearing upon the lever 17 through a pin-and-socket joint 60, causes movement of said lever 17 to actuate the damper members 10 to swing the same toward closed position, and thereby reduce the escape of heated air into the room. Conversely, if the temperature of the air in the room falls below a predetermined amount, such air in descending through the passage 5 cools the thermostat 18 and causes contraction thereof and an actuation of the intermediate links and levers to open the damper members 10, a spring being provided to accomplish the opening of the damper members if thrust-pin 59 is not positively connected to lever 17.

Air entering from the room, in descending through passage 5, also passes over the wick 39 before the air becomes further heated and causes an evaporation of the water in the wick. Evaporation of the water takes up heat from the lower thermostat 32 in proportion to the rate of evaporation. The rate of evaporation in turn depends upon the relative humidity of the air. Therefore the difference in temperature between the upper and lower thermostats is proportional to the relative humidity of the air. A decrease of temperature of the lower thermostat results in a contraction of the same with a corresponding expansion of the upper thermostat, until the vapor tensions within said thermostats exactly balance each other. Such contraction of the lower thermostat and expansion of the upper thermostat produces a displacement of the connecting rod 34 which, through its flanges 35, operates bell-crank lever 28 to slide damper plate 25 to a position permitting the escape of water-vapor from the vaporizing pan. As the relative humidity of the air rises, evaporation from the lower thermostat decreases, the temperature of the lower thermostat rises, the upper thermostat contracts, and connecting rod 34 operates bell-crank 28 to move damper plate 25 toward closed position.

If no means were provided for opposing contraction of the lower thermostat, such thermostat would be at a lower temperature than the upper at all conditions of humidity short of complete saturation. It is desirable, however, that the damper above the vaporizing pan be not opened to permit the escape of vapor until the relative humidity of the atmosphere has fallen below a predetermined amount. To this end means are provided for opposing the contraction of the lower thermostat until there is such a difference of temperature between the thermostats, produced by a predetermined relative evaporation from the lower thermostat, as to produce a tendency to contraction thereof sufficient to overcome said opposing means. In the embodiment illustrated, such opposing means is provided by the spring 47 which may be adjusted by means of the thumb-nut 49 and screw 48 to predetermine the relative humidity at which the tendency to contract of the lower thermostat overcomes the opposition of the upper thermostat plus the resistance of the spring. When the relative humidity rises above this predetermined amount, the rate of evaporation from the lower thermostat is not enough to lower the temperature thereof sufficiently to overcome the upper thermostat when aided by the spring 47.

While the supply of water to the vessel 38 has been illustrated as from the vaporizing pan 21, it is to be understood that the supply might be taken directly from the main source of water supply, as from the pipe 53, in which case, however, a float-valve would have to be provided sufficiently strong to overcome the head in the water main rather than the small head existing in the construction as illustrated on the drawing.

While the illustrated embodiment has been described with considerable particularity, it is to be expressly understood that the invention is not to be restricted to the particular form shown, as parts thereof are capable of use without other parts thereof, as various modifications and embodiments will readily suggest themselves to those skilled in the art, and as certain features of the hygrometric control are equally applicable to other systems for supplying heat to a room or apartment. Reference is therefore to be had to the appended claims in determining the limits of this invention.

What is claimed is:

1. A casing constructed to closely embrace a room radiator and provided with means for regulating the flow of heated air therethrough, a vaporizing pan carried by said casing, means for regulating the escape of vapor from said pan, and hygrometric means carried by said casing for controlling said last-named regulating means.

2. A casing constructed to closely embrace a room radiator and provided with means for regulating the flow of heated air therethrough, a vaporizing pan for subjection to the heat of said radiator, means for regulating the escape of vapor from said pan, and hygrometric means for controlling said last-named regulating means positioned for subjection to the air flowing through said casing before it is heated by said radiator.

3. A casing constructed to closely embrace a room radiator and provided with means for regulating the flow of heated air therethrough, thermostatic means controlling said regulating means, a vaporizing pan for subjection to the heat of said radiator, means for regulating the escape of vapor from said pan, and hygrometric means for controlling said last-named regulating means.

4. A casing constructed to closely embrace a room radiator and providing a circulation of air therethrough, a vaporizing pan for subjection to the heat of said radiator, means for regulating the escape of vapor from said pan, and hygrometric means subjected to the incoming circulation of air and controlling said regulating means.

5. A casing provided with a chamber for closely embracing a room radiator and a passage through which a circulation of air from outside said casing is maintained, a vaporizing pan for subjection to the heat of said radiator, means for regulating the escape of vapor from said pan, and hygrometric means in said passage for controlling said regulating means.

6. In combination, a radiator casing having means providing a circulation through said casing of air from outside said casing, means for regulating the flow of air past the radiator, thermosensitive means subjected to said circulation of air for controlling said regulating means, a vaporizing pan, means for regulating the escape of vapor from said pan, and hygrometric means subjected to said circulation of air for controlling said last-named regulating means.

7. A casing constructed to closely embrace a room radiator and provided with a vaporizing pan for subjection to the heat of said radiator, means for regulating the escape of vapor from said pan, opposed thermostats carried by said casing for operating said regulating means, and means whereby one of said thermostats is subjected to the cooling influence of evaporation.

8. A casing constructed for closely embracing a room radiator and provided with a vaporizing pan for subjection to the heat of said radiator, means for regulating the escape of vapor from said pan, opposed expansible and collapsible thermostatic vessels having their movable end walls connected, means whereby one of said thermostats is subjected to the cooling influence of evaporation, and means for operating said regulating means directly from said thermostatic vessels.

9. A casing constructed for closely embracing a room radiator and provided with a vaporizing pan for subjection to the heat of said radiator, means for regulating the escape of vapor from said pan, opposed thermostats directly operating said regulating means, means whereby one of said thermostats is subjected to the cooling influence of evaporation, and adjustable means for predetermining the maximum relative humidity at which vapor may escape from said pan.

10. A casing constructed for closely embracing a room radiator and provided with means forming a passage through which a circulation of air from outside the casing is maintained, a vaporizing pan for subjection to the heat of said radiator, means for regulating the escape of vapor from said pan, opposed thermostats in said passage for operating said regulating means, and means whereby one of said thermostats is subjected to the cooling influence of evaporation.

11. In combination with a source of heat, a vaporizing pan, means for regulating the escape of vapor from said pan, opposed thermostats controlling said regulating means, means whereby one of said thermostats is subjected to the cooling influence of evaporation, and adjustable resilient means opposing actuation of said regulating means by said thermostats.

12. A casing constructed to closely embrace a room radiator and provided with means for regulating the flow of heated air therethrough, thermostatic means controlling said regulating means, a vaporizing pan for subjection to the heat of said radiator, means for regulating the escape of vapor from said pan, and hygrometric means for controlling said last-named regulating means, said thermostatic and hygrometric means being positioned for subjection to the air flowing through said casing before it is heated by said radiator.

13. In combination with a source of heat, a vaporizing pan, means for regulating the escape of vapor from said pan, opposed expansible and collapsible thermostatic vessels having their movable end walls connected, means for operating said regulating means from said thermostats, means whereby one of said thermostats is subjected to the cooling influence of evaporation, and means to adjust said thermostatic vessels to maintain a predetermined humidity.

14. In combination, a radiator casing provided with a vaporizing pan, a damper for regulating the escape of vapor from said pan, opposed thermostats controlling said regulating means and subjected to the air entering said casing, means whereby one of said thermostats is subjected to the cooling influence of evaporation, and adjustable means opposing contraction of said last-named thermostat.

15. A casing constructed for closely embracing a room radiator and provided with a vaporizing pan for subjection to the heat of said radiator, means for regulating the escape of vapor from said pan, opposed thermostats carried by said casing for operating said regulating means, a wick surrounding one of said thermostats, and a vessel receiving one end of said wick and supplying the same with water.

16. A casing constructed for closely embracing a room radiator and provided with a vaporizing pan for subjection to the heat of said radiator, means for regulating the escape of vapor from said pan, opposed thermostats carried by said casing for operating said regulating means, a wick surrounding one of said thermostats, a vessel for supplying said wick with water, and means whereby said vessel is automatically supplied with water.

17. A casing constructed for closely embracing a room radiator and providing a passage through which a circulation of air from outside said casing is maintained, a vaporizing pan for subjection to the heat of said radiator, means for regulating the escape of vapor from said pan, opposed thermostats in said passage for operating said regulating means, a wick surrounding one of said thermostats, and means supplying said wick with water from said vaporizing pan.

18. A casing constructed for closely embracing a room radiator and provided with a vaporizing pan, a damper for controlling the escape of vapor from said pan, a passage in said casing through which a circulation of air is induced by said radiator, and hygrometric means in said passage for controlling said damper.

19. A casing constructed for closely embracing a room radiator and provided with a vaporizing pan, a damper for controlling the escape of vapor from said pan, a passage in said casing through which a circulation of air is induced by said radiator, opposed thermostats in said passage operatively connected to said damper, and means whereby one of said thermostats is subjected to the cooling influence of evaporation.

20. A casing constructed for closely embracing a room radiator and provided with a vaporizing pan, a damper for controlling the escape of vapor from said pan, a passage in said casing through which a circulation of air is induced by said radiator, hygrometric means in said passage for operating said damper, a damper controlling the flow of heated air through said casing, and thermostatic means in said passage for operating said last-named damper.

In testimony whereof I have signed this specification.

WESTON M. FULTON.